Williams & Joslin,
Ellipsograph.

No. 22,910.  Patented Feb. 8, 1859.

UNITED STATES PATENT OFFICE.

THOS. WILLIAMS AND W. C. JOSLIN, OF FISHERSVILLE, CONNECTICUT.

ELLIPSOGRAPH.

Specification of Letters Patent No. 22,910, dated February 8, 1859.

*To all whom it may concern:*

Be it known that we, THOMAS WILLIAMS and W. C. JOSLIN, both of Fishersville, in the county of Windham and State of Connecticut, have invented a new and Improved Instrument for Drawing Curves and Figures Approximating in Form Ovals; and we do hereby declare that the following is a full, clear, and exact description of the same, reference being had to the accompanying drawing, making a part of this specification, in which—

Figure 1:
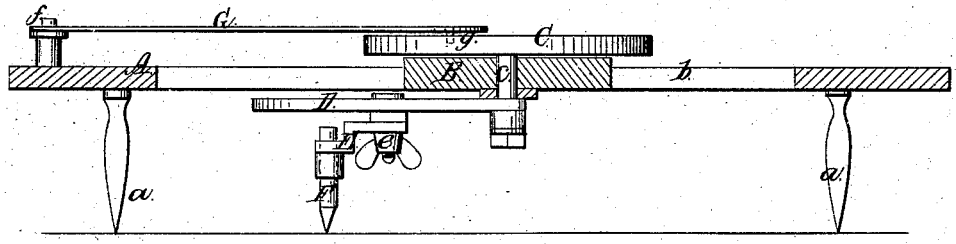
Figure 2:
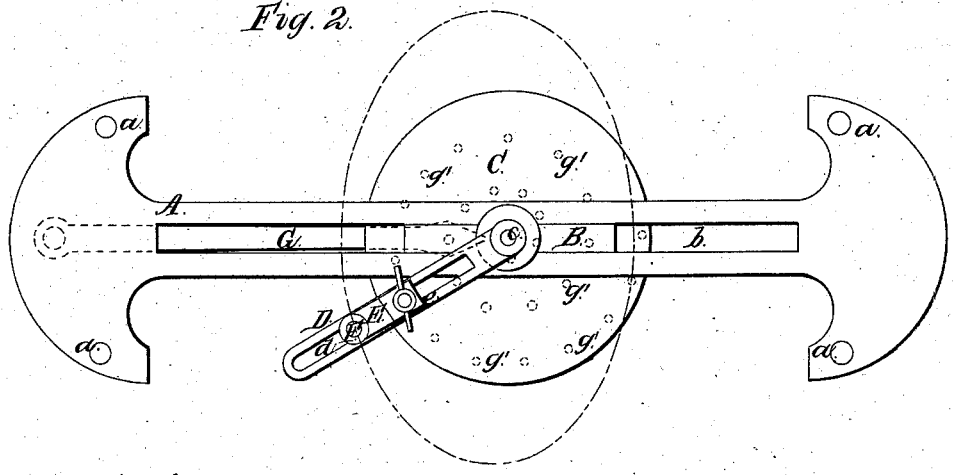

Figure 1 is a longitudinal vertical and central section of our instrument. Fig. 2 is an inverted plan of the same.

Similar letters of reference denote like parts in both figures.

This invention consists in having a slotted bar supported by legs, and a slide fitted in the slot; the said slide having the axis of a circular disk passing through it, to the lower end of which axis a bar is attached which contains an adjustable pencil stock. The disk is perforated with holes, in either of which the pin of an arm pivoted to the slotted bar, may be fitted; the whole being arranged as hereinafter shown and described, whereby curves and figures approximating in form to ovals may be drawn with great facility and in a perfect manner.

To enable those skilled in the art to make and use our invention, we will proceed to describe it.

A, represents a horizontal bar which is slotted longitudinally and is supported at a proper height by legs $a$, $a$, the ends of which are pointed so as to slightly penetrate the paper and board and retain the implement in the desired position.

B, is a bar or slide which is fitted in the slot $b$, of the bar A, and allowed to move freely therein. Vertically through the center of the slide B, an arbor $c$, passes and a circular disk C is attached to the upper end of the arbor $c$. To the lower end of the arbor $c$, a horizontal slotted bar D is attached and in the slot $d$, of this bar a pencil stock E, is fitted and secured therein by a set screw or thumb nut $e$. The slot $d$, extends nearly the whole length of the bar D. F, is a pencil fitted vertically in the stock E. The bar E is attached permanently to the arbor $c$, and turns with it. The disk C is also attached permanently to the arbor $c$.

To the upper surface of the bar A, near one end of it an elastic rod or bar G, is pivoted as shown at $f$, said rod or bar having a pin $g$, projecting down from its inner or opposite end, as shown clearly in Fig. 1. In the upper surface of the disk C, holes $g'$ are made. These holes may be made in a spiral line or coil extending from the center of the disk to the periphery, as shown by dotted lines in Fig. 1.

Having thus described our invention, what we claim as new, and desire to secure by Letters Patent, is:—

The slotted bar A, provided with the slide B; the arbor $c$, passing through the slide B, with the disk C, and slotted bar D attached; and the elastic bar G, pivoted to the bar A, and connected eccentrically with the disk C; the bar D having the pencil stock E attached, and the whole arranged substantially as and for the purpose set forth.

THOS. WILLIAMS.
WILLIAM C. JOSLIN.

Witnesses:
THOS. WILBUR,
GEORGE BARNETT.